(12) United States Patent
Carr (10) Patent No.: US 7,736,127 B1
(45) Date of Patent: Jun. 15, 2010

(54) ROTOR DESIGN FOR SUBMERSIBLE ELECTRONIC GENERATOR

(76) Inventor: Fred K. Carr, 915 Coker Dr., Chapel Hill, NC (US) 27517

( * ) Notice: Subject to any disclaimer, the term of this patent is extended or adjusted under 35 U.S.C. 154(b) by 0 days.

(21) Appl. No.: 12/361,179

(22) Filed: Jan. 28, 2009

(51) Int. Cl.
*F03B 3/06* (2006.01)
*F03B 3/12* (2006.01)
*F03B 3/14* (2006.01)

(52) U.S. Cl. ............... 416/1; 416/205; 416/207; 416/197 R; 416/238; 416/243; 416/DIG. 2; 416/DIG. 5; 290/54

(58) Field of Classification Search ............... 415/3.1, 415/4.3, 4.5, 906, 908; 416/1, 197 R, 197 A, 416/205–207, 223 R, 238, 243, DIG. 2, DIG. 5; 290/43, 44, 54, 55
See application file for complete search history.

(56) References Cited

U.S. PATENT DOCUMENTS

| | | | | |
|---|---|---|---|---|
| 3,594,099 A * | 7/1971 | Herbert | ............ | 416/207 |
| 4,256,435 A * | 3/1981 | Eckel | ............ | 416/207 |
| 4,692,097 A * | 9/1987 | Bibollet | ............ | 416/207 |
| 5,611,665 A * | 3/1997 | Angel | ............ | 416/1 |
| 5,997,253 A * | 12/1999 | Feehan | ............ | 416/207 |
| 6,302,652 B1 * | 10/2001 | Roberts | ............ | 416/243 |
| 7,378,750 B2 * | 5/2008 | Williams | ............ | 290/43 |
| 7,385,302 B2 * | 6/2008 | Jonsson | ............ | 290/54 |
| 2008/0138206 A1 * | 6/2008 | Corren | ............ | 416/223 R |

\* cited by examiner

*Primary Examiner*—Christopher Verdier
(74) *Attorney, Agent, or Firm*—Fred K. Carr (57) ABSTRACT

An improved rotor blade used in combination with a submersible electrical generator comprises a rotor base with width W, a leading edge, a tip, and a trailing edge. The leading edge and the trailing edge are defined as elliptical curves having a radius of 8.0(W). A straight line drawn from the front of the base to the lip forms a forty five degree angle with respect to the rotor base. The rotor blade is functionally connected to a rotor shaft through a pivotal support axial which allows the pitch of the blade to be set and maintained. The pitch is set to harness the kinetic energy of flowing water thereby generating electricity.

13 Claims, 9 Drawing Sheets

ROTOR DESIGN FOR SUBMERSIBLE ELECTRONIC GENERATOR

BACKGROUND OF THE INVENTION

1. Field of the Invention

The present invention relates to the generation of electrical power from submerged generators using tidal currents to turn the generators, but it may be adapted to more powerful ocean current applications.

2. Description of the Prior Art

The decrease in the amount and production of world crude oil, and North America natural gas, presents a potential catastrophic problem for the industrial world. While the amount and location of crude oil reserves are not well documented, it is acknowledged that there is limited amount of the fossil fuels in reserve. In addition, many feel that the combustion of the fossil fuels for transportation and energy production contributes to global warming. It would therefore be a worthwhile thing to switch from fossil fuels for energy production to energy sources which are self-sustaining and non-polluting. Other recently investigated possibilities for renewable resources include wind, solar, geothermal, and biomass. A couple of these show real potential, and are either in use or under further development. Ocean wave and tidal currents are probably the last of the large natural resources not yet fully investigated for the production of energy, and in particular, electricity. This disclosure relates to using tidal currents to generate electricity.

The United States, with coast lines on both sides and a network of inland rivers and lakes, has significant amounts of ocean wave and tidal power energy resources. These resources are renewable and emission free for energy production. With proper system design and deployment, ocean wave and tidal power could become one of the most environmentally friendly methods for generating electricity yet developed. The Electrical Power Research Institute (EPRI) has projected that as much as 10% of the national energy demand (400 trillion watts per year) could be harnessed from US wave and tidal current energy resources.

Waves are created by winds blowing over large bodies of water; tidal changes in the sea are generated by solar and lunar gravitational forces. As the earth rotates the elliptical envelope shape of the ocean floor causes the water level to rise and fall. Ocean waves and tides contain tremendous amounts of kinetic energy which could be harnessed to turn generators for the production of electricity. Water is several hundred times denser than air, therefore, has more kinetic energy per unit speed.

It is the eastward rotation of the Earth which generates the winds which cause the waves. The Gulf Stream and the Kuroshio are two significant natural currents resulting from the Earth's rotation. The Gulf Stream starts just south of the Florida Keys and continues north for about 400 miles. The current has an average speed between 4-7 miles per hour depending on width. So long as the Earth rotates eastward, there will be winds generating waves and currents, and tidal changes will result from lunar and solar gravitational forces. This enormous power, if appropriately harnessed, is fuel cost-free, non-polluting, and self-sustaining. Furthermore, tidal currents are predictable for the indefinite future: wave patterns are predictable for days in advance. Predictability is an important characteristic for an energy source used in electrical generation which is inputted into an electric grid where the supply equals demand.

Oceanologists calculate wave power in watts per unit wave length in meters which is a function of wave period in seconds and the square of the wave height in meters squared. The harnessing of wave energy is complex and several devices have been proposed including: point absorbers, oscillating water columns, overtopping terminators, and linear wave absorbers. Since this disclosure does not focus on wave energy, these devices are noted but not discussed in detail.

Oceanologists calculate tidal current power in watts per unit cross-sectional area in meters squared which is a function of the density of the water and the cube of the speed in meters per second. For example, the EPRI calculated the annual depth average power density of the tidal flows under the Golden Gate Bridge to be in the order of 3 Kilowatts per meter squared. The average US home uses 1.3 kW per day. The EPRI estimates that the total tidal and river potential to be in the order of 149 trillion watt hours per year or about 3.5% US national electricity demand.

The present disclosure is concerned with harnessing tidal power, which as previously discussed, is generated by lunar and solar gravitational forces as the Earth rotates eastward. The tidal currents are to be distinguished from the powerful currents occurring in the Gulf Stream which are caused by winds, uneven temperatures, and the shape of existing land masses. Tidal currents are the periodic motion of water caused by the different lunar and solar gravitational attractive forces on different parts of the eastward rotating Earth. As these gravitational forces change, tides rise and fall causing periodic horizontal movement of water, the tidal currents. The tidal current speed varies from place to place depending on the shape of the coastline being strongest in inlets, sounds, coastal waterways, and related. Since the amount of electricity generated depends on the speed and steadiness of the water driving the generating device, the tidal currents can produce electricity only between high tides and low tides.

For the above reasons, the "capacity factor" for the tidal currents is somewhat less than, for example, powerful ocean currents as in the Gulf Stream which are constant at 4-7 MPH 24 hours per day. The EPRI has estimated that with tidal units and wind units the average power is typically between 30-40% of the "rated power" which is based on a capacity factor of 24 hours per day of continuous year long operation. While the extraction rate is somewhat low, it is well worth the effort since the energy is self sustaining, non-polluting and fuel cost-free.

Tidal kinetic energy extraction is an extremely complex operation and several devices have been proposed as discussed below. Prior art most often discusses the design of these devices in terms of their physical arrangement. Water turbines, as well as wind turbines, are generally grouped into two types: 1. Vertical-axis devices in which the axis of rotation of the water/wind driven rotor is vertical to the ground and perpendicular to the energy stream, and 2. Horizontal-axis devices in which the axis of rotation of the water/wind driven rotor is horizontal with respect to the ground and parallel to the energy stream. An example of the former is the Blue Energy Ocean Turbine located in Canada. An example of the latter is the presently used wind mills in which the axis of rotation is parallel to the ground.

Generators are well known in the prior art, and similar in design and function when used in hydro-electric, wind, or ocean currents. Several models are available commercially, usable in either wind or water, provided the water unit has a water-proof housing. The kinetic energy of the water turns a rotor blade which is attached to a rotor shaft which extends into the generator. A series of step-up gears increase the rotational speed such that electricity is generated.

The rotor blades of prior art wind turbines tend to be long and narrow. The reason for this long and narrow design is that the rotors are easier to tie down and secure during violent wind storms, not that they are more efficient in capturing kinetic energy. These long and narrow rotor blades have been tried in water turbine systems, but have encountered several problems. The two major problems are they destroy fish and other marine species, and the blades are damaged by sea weeds and other submerged debris in the water.

Prior art turbines tested to date destroyed fish and other marine species to the extent that the devices have been nicknamed "chum machines". The long, sweeping motion of the rotor blades tend to attract fish and injure them as they swim by in the sweep path of the rotor blades. In addition, these blades generate a lot of bubbles in the water. This is caused by cavitation, which is caused by difference in pressure gradients which forms vapor bubbles on the blade surfaces. While not lethal to fish, they are unsightly and may have some environmental impact.

A recent prototype test in the East River at New York demonstrated the second aforementioned problem. The weeds, debris, and other submerged material caused a failure of the prototype test when the rotor blades broke.

Prior art publications can be divided into documents disclosing designs for tidal currents and designs for stronger ocean currents; recalling tidal currents are caused by lunar and solar forces occurring in the more shallow inlets and sounds while the stronger ocean currents are in deeper water as the Gulf Stream. U.S. Pat. No. 7,378,750 issued to Herbert L. Williams, U.S. Pat. No. 6,967,413 issued to Ramez Atiya, and U.S. Pat. No. 5,051,069 issued to Peter T. Redemackerl relate to system designs for the tidal currents. The system disclosed in 750 uses a rotor design which includes hinged vanes attached to a cylindrical drum. The hinged vanes capture the water current turning the drum thereby turning the generator. The 413 disclosure involves an artificial lagoon formed by a series of support columns with a retaining wall to direct the water current toward the generator increasing its force. Patent 069 discloses a rotor with an open center with blades between an inner rim and an outer rim.

U.S. Pat. No. 7,385,302 issued to Stanley C. Johnson discloses a wind turbine having individually pivotal airfoils mounted on a rotatable frame; US 20080138206 published Jun. 6, 2008 discloses a rotor design with anti-foiling tip for shedding seaweed and other submerged debris.

Examples of patent documents disclosing tethered systems for deeper currents such as in the Gulf Stream include U.S. Pat. Nos. 7,291,936, 6,531,788, and published application 20070257492 published Nov. 8, 2007, John Robson inventor. These systems use two counter-rotating full-bladed (16 blades) rotors to turn the generators. Other examples include U.S. Pat. No. 6,726,439 issued to Amir S. Mikhall et al and U.S. Pat. No. 6,091,161 issued to James G. P. Dehlsen et al. The 439 disclosure includes a plurality of blades which can be varied in length to increase or decrease the rotor diameter. The 161 disclosure discusses variable pitch rotor blades, where the pitch is controlled by an ascend-descend protocol for controlling depth. U.S. Pat. No. 7,279,803 issued to Kenneth Randall Boslley discloses a different system design where an impeller is set in a frame and rotates around a non-moving shaft. Electromagnetic coils on the impeller and the frame generate electrical current.

The above references fail to at least teach or suggest the design of the presently disclosed and claimed invention. Other references are cited in the Information disclosure Statement.

BRIEF SUMMARY OF THE INVENTION

In summary, the improved rotor blade system of the present disclosure is defined as a rotor blade having a base of Width BW, a leading edge, a tip, a trailing edge, where the leading edge begins at the front end of the base and extends upward to the tip, the trailing edge begins at the tip and extends to the back end of the base. The leading edge and the trailing edge are further defined as having elliptically curved edges formed by a radius of eight times the base Width, 8(BW), whereby a straight line drawn from the front of the rotor base to the rotor tip forms a forty five degree angle with respect to the rotor base, and thus the axis of rotation. The rotor blade is functionally connected to a rotor shaft which serves as the axis of rotation through a hub, where one end of the rotor shaft extends into a generator and the other end has a perpendicular pivotal support axial extending through a channel in the hub up to the center of the rotor blade providing a pivotal axial for setting the pitch of the rotor blade relative to the hub. The pitch can be preset and maintained for operation through a locking pin mechanism. The system is submerged with the axis of rotation parallel to flowing water such that the kinetic energy in the water turns the rotor blade converting the kinetic energy to rotation mechanical energy which is transferred through the rotor shaft to a generator for generating electricity which is transferred to an electric grid for use.

The elliptically curved design of the present invention was derived to address two major problems encountered with prior art designs: fish kill and other marine species injury, and the retention of seaweed and other debris on the rotor which causes damage. First the fish kill. The wider the rotor sweep path, that is the diameter from rotor tip to rotor tip, the greater the potential for fish kill and other marine species injury. The elliptically curved design of the present blade decreases the rotor sweep path by twenty five percent since the blade is set at a forty five degree angle relative to straight edge blades, that is, its sweep path diameter is twenty five percent less. In addition, the elliptically curved design set at forty five degrees in the rotor path tends to push the fish aside rather than fatally injury them.

Prototype testing of the straight edge design has demonstrated that the collection of seaweed and other submerged debris on the rotor is a major problem. A recent test in the East River was halted after the seaweed and other debris caused major rotor damage. The curved design of the present disclosure allows the seaweed and other debris to slide along the top of the curved blade rather than being entrapped on it as with the prior art straight edge blades. The curved design allows the currents to slide the weed along the top off into the currents.

The turning of the rotor by the flowing water removes the kinetic energy from the water. There has been some speculation that removing the kinetic energy of the currents may have local environmental effects, although this has not been established. The presently disclosed design has a variable pitch feature which will provide a great tool for evaluating this. The greater the pitch, the more kinetic energy removed.

Accordingly, the primary objective of this invention is to provide a turbine rotor blade for use with a submerged generator placed roughly parallel in flowing water where the kinetic energy in the flowing water causes the rotor to turn which spins the generator generating electricity.

A further objective of the invention is to provide a variable pitch rotor blade where the pitch of the blade relative to the flow of water can be adjusted and maintain determining the amount of kinetic energy removed from the flowing water.

A further objective of the invention is to provide a rotor blade which is functionally connected to a rotor shaft through a perpendicular pivotal support axial such that the pitch of the blade can be adjusted and maintained where the kinetic energy of the flowing water is transferred to the generator through the rotor shaft as rotational energy.

A further objective of the invention is to provide a rotor which has a smaller rotor sweep path diameter compared to straight edge blades.

A further objective of the invention is to provide a rotor which has an elliptically curved edge design allowing seaweed and other submerged debris to slide off the tip into the current rather than being trapped as with prior art deigns.

BRIEF DESCRIPTION OF THE DRAWINGS

Other features of the present invention will become more evident from a consideration of the following patent drawings, which form a part of this specification.

DETAILED DESCRIPTION OF THE INVENTION

Figure 1:
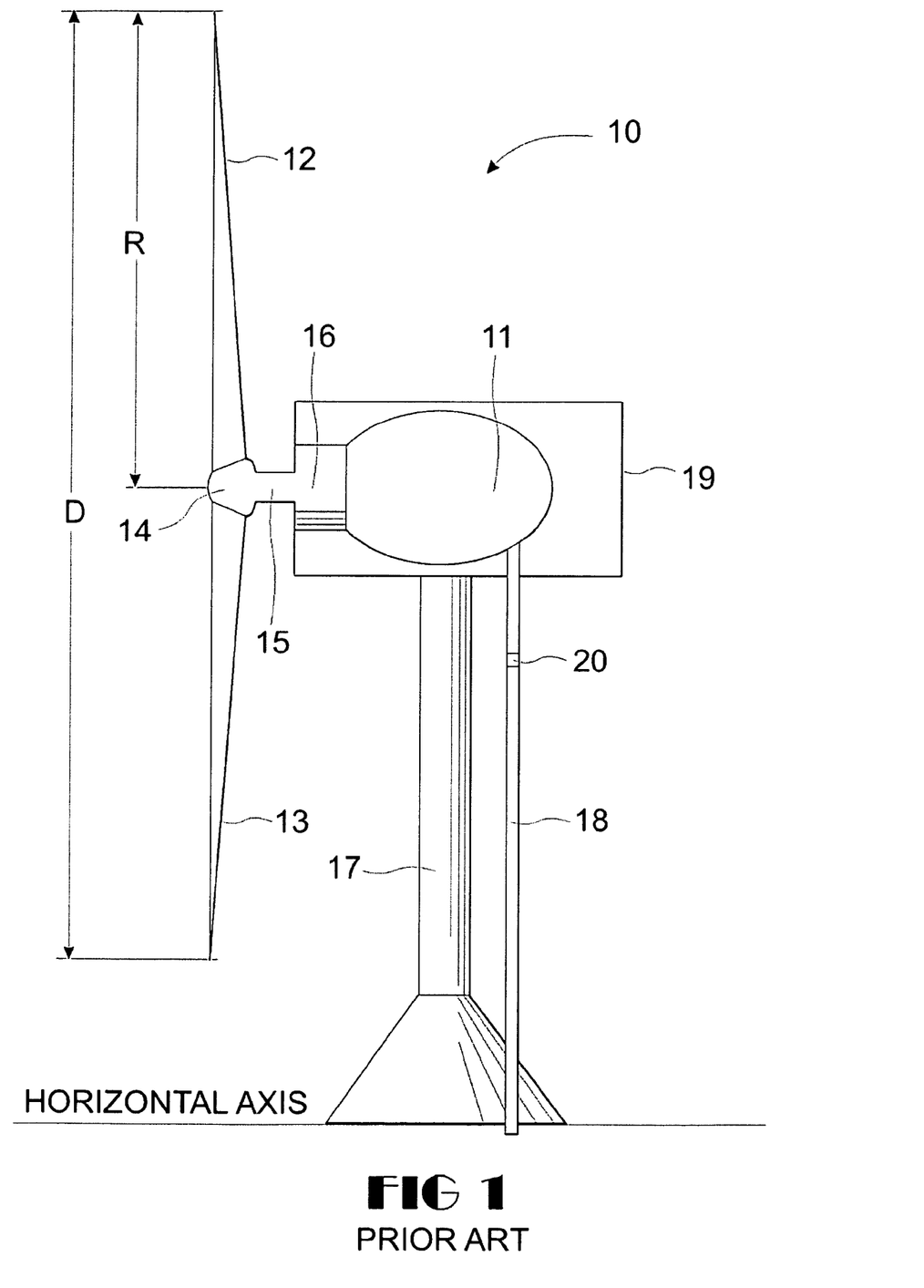
FIG. 1 is a schematic side view of a prior art electrical power generating system.

Referring now to the drawings, and first to FIG. 1, there is shown a schematic view of a typical prior art electrical power current generating system, generally designated 10. The power current generator 10 includes an electrical generator 11, rotor blades 12,13 attached to a rotor hub 14 which is further attached to a rotor shaft 15 which is connected to step-up gears 16. The rotor shaft 15 has an external portion exterior to the generator housing 19 connecting to the rotor hub 14 and an interior portion interior in the generator housing 19 connecting to the step-up gear box 16. The rotor shaft 15 transfers the harnessed rotating mechanical energy to the step-up gear box 16 which in turn increases the rotation speed sufficient to generate electricity.

The kinetic energy in the water current causes the rotor blades 12,13 to rotate which in turn cause the rotor shaft 15 to turn since both are commonly attached to the rotor hub 14. Water is several hundred times denser than air, therefore, flowing water generates a powerful force. The kinetic energy in the flowing water is converted to rotating mechanical energy which turns the generator 11 generating electricity. The electricity is delivered to a power grid (not shown) through power cable 18. The power cable has 18 has an electrical connector 20 connecting the generator 11 to the power grid, and providing a method for removing the power generator 10 and disabling it from the power grid. The support frame 17 maintains and holds the generating system 10 in the submerged position.

The prior art example in FIG. 1 shows a power generating system with two rotor blades 12,13 attached to a rotor hub 14 forming a system with two rotating blades. Other systems may have other multiples of rotor blades, typically three blades equally positioned around the hub. The rotor system diameter is designated D which is the distance from tip of blade 12 to the tip of blade 13. The rotor system radius is designated R, which is the distance from the axis of rotation (center of hub 14) to the tip of rotor blade 12, where R=(0.5) D. The rotor diameter D defines the "rotor sweep path". This prior art example is a horizontal-axis turbine since its axis of rotation is horizontal with respect to the ground and roughly parallel with respect to the water current.

Figure 2:
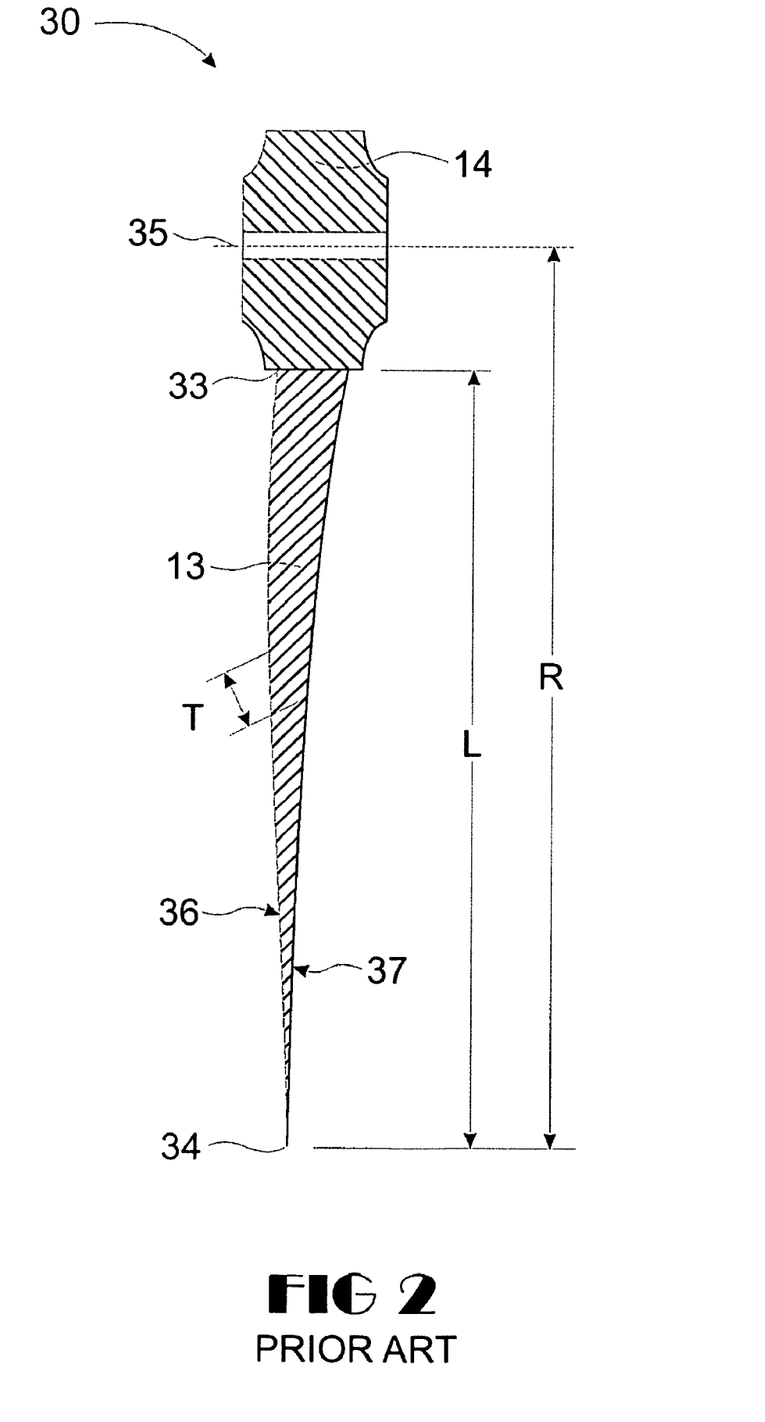
FIG. 2 is a cross-sectional side view of a prior art rotor blade attached to a hub.

Referring now to FIG. 2, there is shown a cross-sectional side view of a prior art rotor blade, generally designated 30. The prior art rotor blade system includes a hub 14 to which blade 13 is attached at the point of attachment 33. The base of the blade is at the point of attachment 33, the other end of the rotor blade 13 is the tip of the blade 34. The axis of rotation 35 is in the center of the hub 14. The forward side, or high pressure side, is referred to as the leading edge 36; the other side, or low pressure side, is referred to as the trailing edge 37. This prior art example is a horizontal-axis system where the axis of rotation 35 is horizontal to the ground, and it has only one rotor blade 13 attached to hub 14, in practice there would be more than one counter-balanced blades attached.

For the purpose of discussing the shape and design of the rotor blades, the following terms and definitions are set forth. Radial distance, shown as R, is the distance from the axis of rotation 35 to the tip of the blade 34, where the axis of rotation 35 is in the center of the hub 14. The Linear Distance, shown as L, is the distance from the base of blade 33 to tip of blade 34. The thickness, defined as T, is the length of a line between the leading edge 36 and trailing edge 37 at any given cross-section. Thickness would vary depending on the point of measurement along L. The mid-point of the blade 13 would be half way between point of attachment 33 and the tip of the blade 34. Any point along the L of the blade could be identified as a multiple from (0.0 to 1.0)L.

Figure 3:
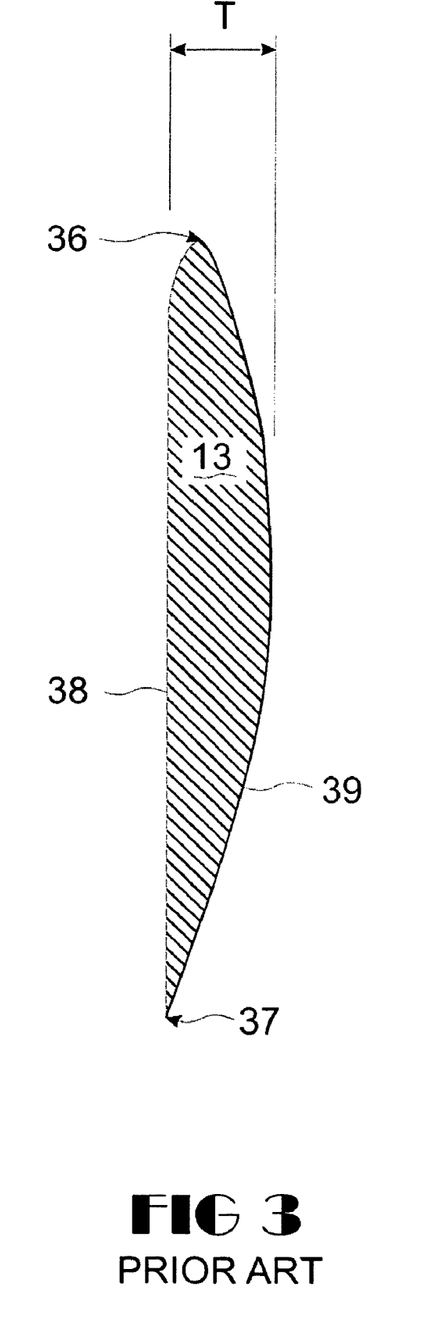
FIG. 3 is an enlarged cross-sectional end view of a prior art rotor blade.

Referring now to FIG. 3, there is shown an enlarged cross-sectional end view of the blade 13. The leading edge 36 of the blade 13 is shown toward the top of the page and the trailing edge 37 is shown lower on the page. The high pressure side 38 is oriented left and the low pressure side is oriented rightward. Thickness is denoted by T. Generally the structural design for giving maximum strength of prior art rotor blades is such that the thickness ratio tapers from thickest at the base to thinnest at the tip.

Foil is a term sometimes used to describe the overall shape of a rotor blade. Foil can be used to identify the shapes of a plurality of cross-sectional areas from the base of the blade to the tip of the blade taken along a common reference line, later discussed. Referring back to FIG. 2, it can be seen that there tends to be a progressive decrease in foil as the blade progresses from blade base 33 to blade tip 34. Rotor blades used on wind turbines tend to be long and slender. This is not because they capture more energy, but because the long and slender design is easier to secure during violent winds.

Figure 4:
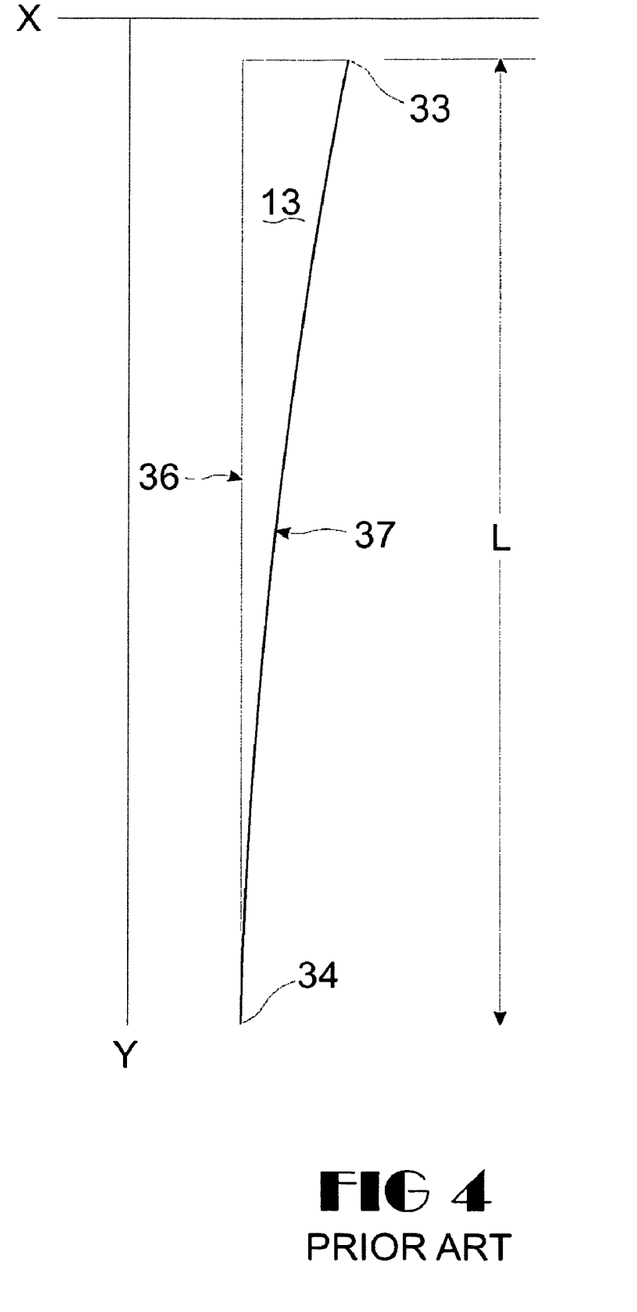
FIG. 4 is a schematic side view of a prior art rotor blade placed in a coordinate system.

After a review of the patent database and scientific literature, it was concluded that the leading edge of prior art rotor blades tend to form nearly a straight angle from rotor base to rotor tip. Also there tends to be a progressive decrease in thickness from the rotor base to rotor tip, therefore, the trailing edge forms a modest negative angle. Referring now to FIG. 4, there is shown the rotor blade 13 from FIG. 2 placed in an x-y coordinate system to demonstrate the nearly straight angle of the leading edge 38 and modest negative angle of the trailing edge 37 formed by the progressive decrease in foil from base to tip. This is not to imply that every prior art rotor blade forms an exact straight angle from base to tip, but points out the nearly straight edge structural design from front of base to rotor tip in prior art rotor blades. This feature is in contrast to the curved structural design of the present invention which is based on a blade which is set at forty five degrees relate to the axis of rotation.

Wind turbines were designed, manufactured, and put into practice several years ago. As previously discussed, rotor blades for wind turbines tend to be long and slender since they are easier to secure during violent winds. Many of the structural design features of the wind turbines have been kept in place as turbines progressed from wind to water as the source for kinetic energy. This is especially true for the rotor blades.

Prototype testing thus far for water turbine systems has demonstrated at least four observable, significant problems which must be addressed before these systems can be successfully commercialization. The problems are: 1. Injury to fish and other marine species from the turning of the prior art rotor blades. 2. The prior art rotor blades are susceptible to damage from sea weed and other submerged debris, 3. The prior art rotor blade design causes a lot of bubbles to be generated in the water, and 4. The long rotor sweep pattern necessitates that the prior art systems be placed deep in the water to prevent damage to boats and other bodies on the water surface.

Two of the above stated problems are environmental and two are structural. The environmental problems are marine species injury and bubble generation. The injury to fish and other marine species is significant. As previously discussed, the term "crusinart effect" is often used in the literature to describe the fish and other marine species injury caused by the prior art rotating blades. The rotating blades tend to attract the fish, their long slender design generate a wide sweep path causing injury when the fish enter the sweep path. The present design has a smaller sweep path, and is designed to push the fish aside.

This structural design also causes a lot of bubbles to be generated by cavitations, where the different pressure gradients cause vapor bubbles to form. While the bubbles do not cause lethal injury to fish, they are unsightly and could cause yet undetermined negative effects on other marine species.

Structural challenges include rotor damage caused by sea weed and other submerged debris. A recent prototype test in the East River in New York was halted because of rotor damage from submerged weed and other debris. The long straight slender design tends to collect the debris until structural damage occurs. Installation of a turbine in water is an expensive undertaking, replacing a rotor blade is likewise quite expensive.

The long rotor sweep path of the prior art blades is a disadvantage. The wider the sweep path, the deeper the system has to be installed to prevent damage to structures such as boats on or near the surface. The deeper the installation, the more challenging it is. Also in many of the inlets and sounds where tidal systems would go, the water is not deep enough for installation of systems with wide sweep paths. The rotating blade would come too near the surface.

Figure 5:
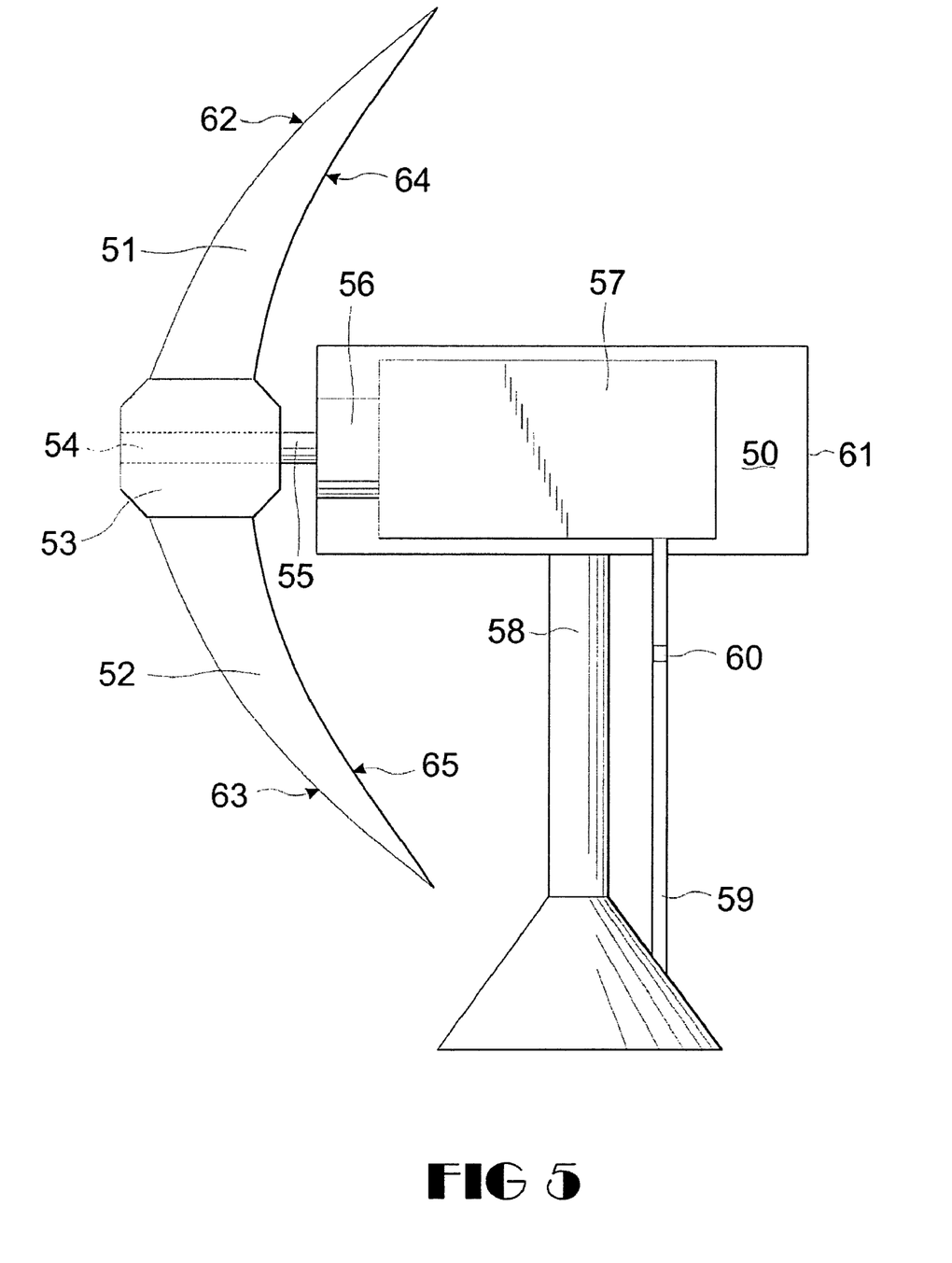
FIG. 5 is a schematic side view of the present submersible electrical generating system.

The present disclosure discloses and claims an improved rotor blade designed to address the above stated problems. Referring now to FIG. 5, there is shown the improved design for a submersible electrical power generating system as disclosed and claimed in the present disclosure, generally designated 50. An important feature of the present disclosure is the structural design of the rotor blade. The improved rotor blade design has elliptically curved edges rather the straight edge design of prior art rotor blades, and the blade forms a forty five degree angle with respect to the axis of rotation. This structural design provides for an improved performance as developed in this disclosure. The curved edges allow debris to slide along the edges and off into the currents. Also, the design significantly decreases the sweep path by twenty five percent.

The electrical power generating system 50 has two counter-balanced rotor blades 51,52. The system could have other multiples of rotor blades; two are shown in the example. The structural design of the rotor system is discussed later in the specification. The blades 51,52 are functionally connected to the hub 53 which has at its exact center the axis of rotation 54. A rotor shaft 55 transfers the rotation mechanical energy to a generator 57. One end of the rotor shaft 55 forms the axis of rotation 54 and the other end extends into the step-up gear box 56 for transferring the rotational mechanical energy.

Rotor blade 51 has a leading edge 62 and a trailing edge 64; rotor blade 52 has a leading edge 63 and a trailing edge 65. The kinetic energy of the moving water turns the rotor blades 51,52 thereby converting the kinetic energy into rotation mechanical energy which is transferred to the step-up gears 56 through the rotor shaft 55. The step-up gears increase the rotational speed through a series of gears. Gear boxes typically contain planetary and helical gears for converting low speed to a higher speed which drives a high speed shaft to generate electricity, which constitutes a step-up gear means. Turbine step-up gears are widely used today, for example, in wind turbines and are commercially available. The increased rotational speed turns the generator 57. Generators are also well known in the art and are used in hydro-electric and wind turbines. Several models are commercially available, Blue Energy of Canada being an example. Water generators have a water tight housing 61 forming a water tight nacelle. The generator 57, step-up gears 56, and water tight housing 61 constitute a generator means.

Support frame 58 positions and holds in place the generating system 50 in the flowing water. In one embodiment the support frame is mounted to a frame support foundation (not shown) in the water. However, the support frame 58 may be attached many ways known to one skilled in the art including existing structures as bridges and docks as well as to floating structures as ships and barges. The support frame 58 is essentially a support member attached at one end to the generator housing 61 and at the other end to a solid structure, bridge, or floating device. When taken together, these constitute a support means.

There is an electrical wire 59 connecting the generator 57 to an electrical grid (not shown) to which the electricity is transferred for use. Electrical connector 60 in electrical wire 59 allows one to disconnect or disable the generator 57 from the grid. The electrical wire 59 and connector 60 could be placed within the support frame 58 for protection.

Figure 6:
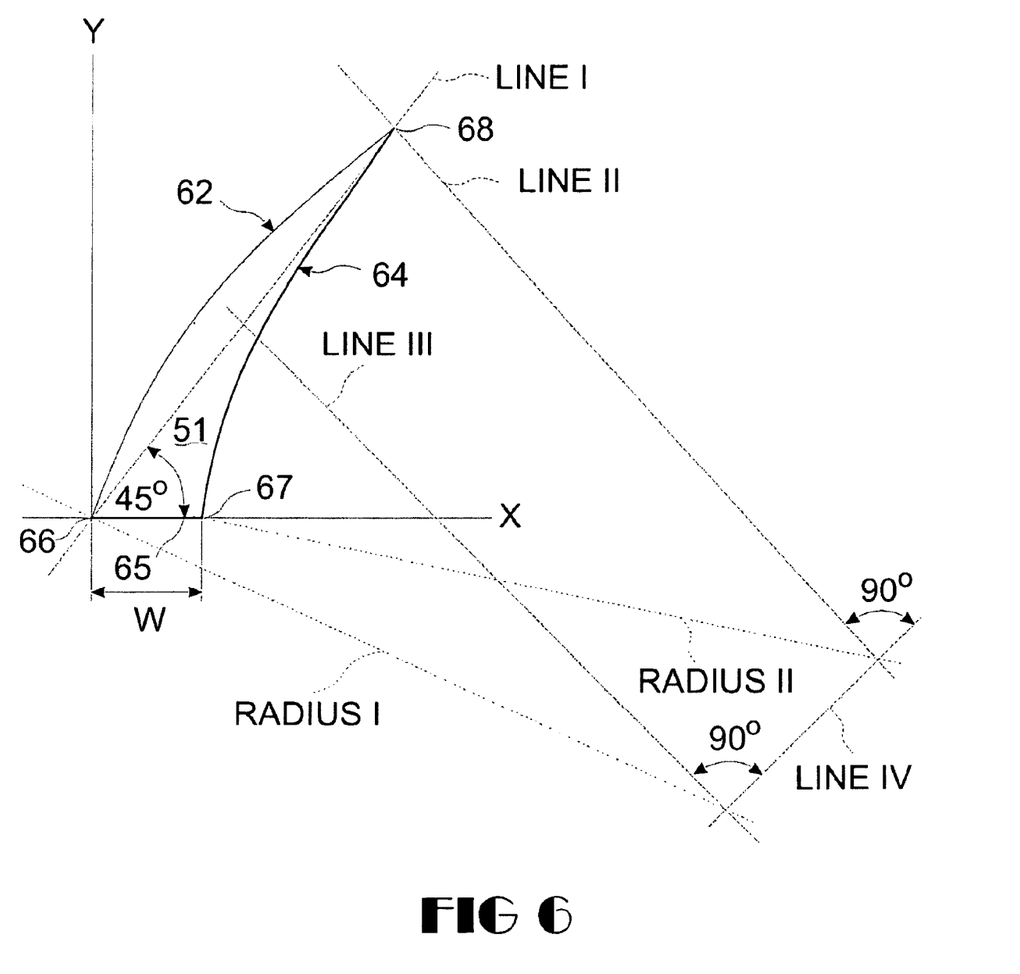
FIG. 6 is a representative view for the geometric derivation and design of the improved rotor blade.

Referring now to FIG. 6, there is shown a coordinate representation of rotor blade 51 demonstrating the geometric coordinates used in the structural design of a preferred embodiment of the present invention. The rotor blade 51 is defined by rotor base 65, rotor leading edge 62, rotor tip 68, and rotor trailing edge 64. The Width of the rotor base 65 is defined by W. Rotor base 65 is further by defined front end of base 66 and rear end of base 67.

Line I, represented as a broken line, forms a 45 degree angle with the x and y coordinates. This is the Line around which the elliptically curved design of the present disclosure is based. The front end 66 of rotor base 65 is positioned at x=0 and y=0, and the rear end 67 of rotor base 65 is positioned at a multiple of x and y=0, it follows that Width equals the x value.

Rotor tip 68 bisects Line I at its upper tip. Line I, drawn from front end of base 66 to rotor tip 68, forms a forty five degree angle with respect to the rotor base 65, the rotor base being parallel to the axis of rotation. Leading edge 62, which starts at front end of base 66 and extends up to rotor tip 68, is an elliptical curve formed by Radius I, discussed below. Likewise trailing edge 64, which starts at rear end of base 67 and extends up to rotor tip 68, is an elliptical curve formed by Radius II. The midpoint of Line I, between the front of base 66 and rotor tip 68, is equal to two times Width, (2.0)W. It follows that the linear distance along Line I from front of base 66 to top of rotor 68 is (4.0)W since (2.0)W is the mid-point.

As stated above, the length of Line I from front of rotor base 66 to tip of rotor 68 is equal to four times Width, (4.0)W; the mid-point of this distance is (2.0)W. Line II is drawn perpendicular to Line I starting at the rotor tip 68; Line III is drawn perpendicular to Line I starting at the mid-point between front of base 66 and rotor tip 68. At a distance of eight times Width, (8.0)W. Line IV is drawn perpendicular to Line III; Line IV intersects Line II at an equal distance of (8.0)W back to tip of rotor 68 since Line I and Line IV are parallel. Line IV is perpendicular to Line II and to Line III where the intercept of Line II with Line IV and Line III with Line IV have a line distance of eight times Width, (8.0)W.

The intercept of Line II with Line IV is the radial base, Radius I, for forming the elliptical curve of leading edge 62 which starts at the front end 66 of rotor base 65 and continues up to end of rotor tip 68. Line III and Line IV intercept is the radial base, designated Radius I, for forming the elliptical curve of trailing edge 64 which starts at rear end 67 of base 65 and continues to end of rotor tip 68. The lengths of Radius I and Radius II are slightly greater than (8.0)W.

Figure 7:
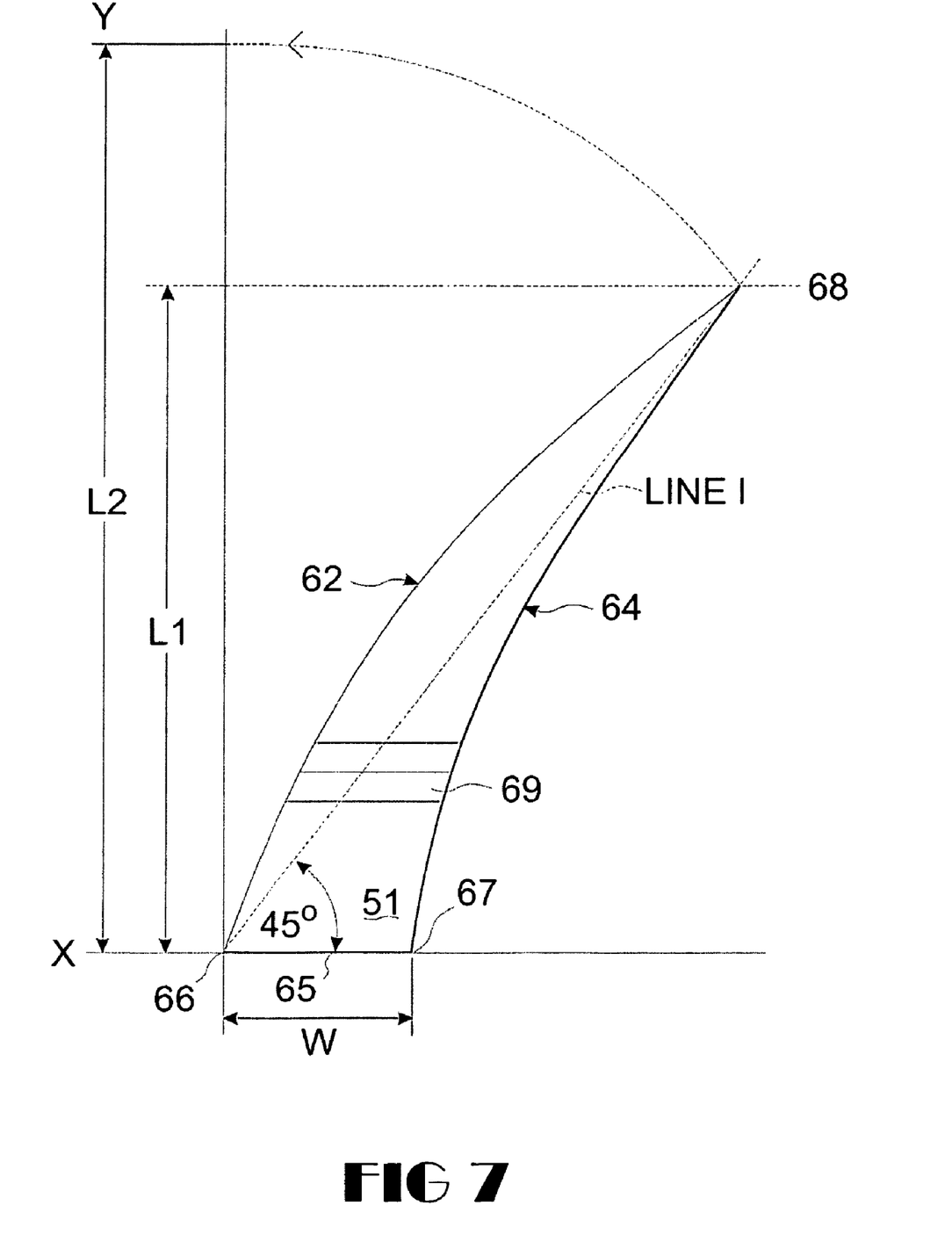
FIG. 7 is an enlarged side view of the improved rotor blade.

Referring now to FIG. 7, there is shown an enlarged schematic view of rotor blade 51 in the x and y coordinate system where the structural design of the blade is based on the previous discussion. Blade 51 includes rotor base 65, front end of base 66, rear end of base 67, leading edge 62, rotor tip 68, and trailing edge 64. As previously discussed, a straight line drawn from front of base 66 through rotor tip 68 forms a 45 degree angle with respect to the rotor base 65. Leading edge 62 and trailing edge 64 are elliptically curved. Width of base 65, designated W, determines the radial line lengths (Radius I and Radius II) which form the elliptical curves defining leading edge 62 and trailing edge 64. In the preferred embodiment, the radial line lengths of Radius I and Radius II is (8.0)W. Width W also determines the linear distance of Line I which goes from front of base 66 to the rotor tip 68. In the preferred embodiment, this distance is (4.0)W.

As discussed earlier, a major disadvantage of prior art rotor blades, which tend to be long and slender, is they generate a wide sweep path. The sweep path can be defined in terms of its diameter, which is the distance from rotor tip to rotor tip, or in terms of its radius which is defined as the distance from the axis of rotation to the tip of the rotors. The curved design of the presently disclosed rotor blade inherently decreases the width of the sweep path by its structural design. This can be demonstrated by comparing the sweep path length of the presently disclosed curved design with the sweep path length of a prior art straight design. For this discussion, the sweep path Lengths, designated L1 and L2 in FIG. 7, are used. The sweep path Lengths, L1 and L2, would by definition be the same as the above defined radial sweep path except the radial sweep path would include one half the hub distance to the axis of rotation, where the blades are connected to the hub.

Decreasing the rotor sweep length in relation to y axis would decrease the diameter of the total sweep path length. The distance the curved design would contribute to the sweep path is shown by L1, which is a perpendicular line drawn from the y axis to the rotor tip 68. Line I has a distance approximately 12.0 cm drawn to the x axis. For comparison to a straight edge rotor blade, imagine that the tip of the rotor were pulled back to the y axis such that the tip of the rotor formed a ninety degree angle with the base of the rotor. In the present disclosure a straight line from the front end of the base 66 to the rotor tip 68 forms a forty five degree angle with the base 65. If the tip is pulled back to the y axis to form the imaginary rotor blade with the same surface area and base width, it would have the approximate length of L2 drawn down to the x axis, shown in FIG. 7. The length of L2 in this demonstration is approximately 16.0 cm. The radial sweep of the present design, the elliptically curved rotor, is almost one-forth less than the radial sweep of the straight, prior art design.

Since the L2 sweep of the prior art rotor blade is almost one-forth greater than the L1 sweep of the present invention, it follows that the straight edge prior art design would have to be positioned at least one-forth deeper in the water to have the same clearance from the top of the sweep path to the surface. Often the sounds and inlets which have the tidal currents are not very deep. The curved rotor design with the lesser sweep path, by a factor of approximately one-forth, would be the better design for these shallow waters.

The overall shape of a rotor blade can further be discussed and defined by the shape of a plurality of cross-sectional areas called foils, where the foils are defined as having a common reference point which is common to all foils. One such common reference point is the y axis since it intersects the front end 66 of rotor base 65 and has a perpendicular relationship with all other cross-sectional areas. Another common reference point is Line I; it forms a forty five degree angle with the cross-sectional foils. For this discussion, let us use the y axis where cross-sectional area 69 is shown as an example, cross-sectional area 69 being perpendicular to the y axis. The entire rotor blade 51 could be defined as a plurality of cross-sectional areas, which are perpendicular to the y axis cross-sectional area 69 being an example, extending from rotor base 65 to rotor tip 68.

Figure 8:
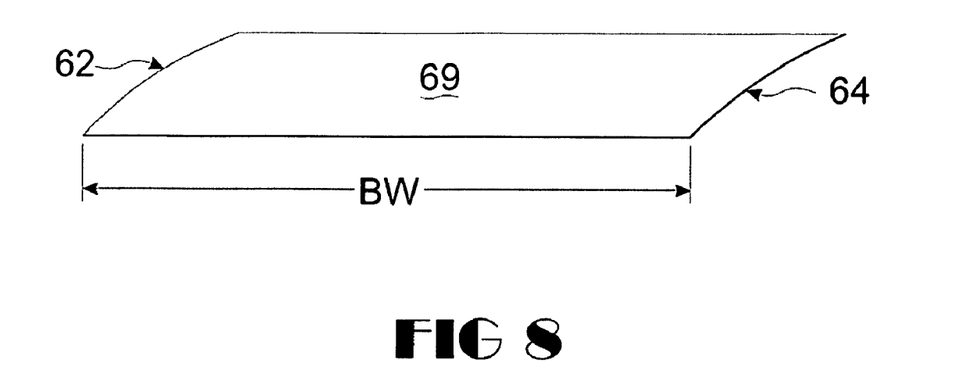
FIG. 8 is an enlarged side view of a cross-sectional area of the improved rotor blade.

Referring now to FIG. 8, there is shown an enlarged side view of a cross-sectional area 69. It has curved leading edge 62 and curved trailing edge 64 formed by Radius I and Radius II respectfully. A plurality of cross-sectional areas extending from rotor base 65 to rotor tip 68 would make up rotor blade 51, where each cross-sectional area would have a characteristic Width W. The cross-sectional area with the greatest Width would be at rotor base 65 which extends from front of base 66 to rear of base 67. If this is defined as Base Width (BW), width at base 65 would equal (1.0)BW, width at mid-point of rotor 51 would equal (0.5)BW, and width at upper rotor tip 51 would equal (0.0)BW.

Figure 9:
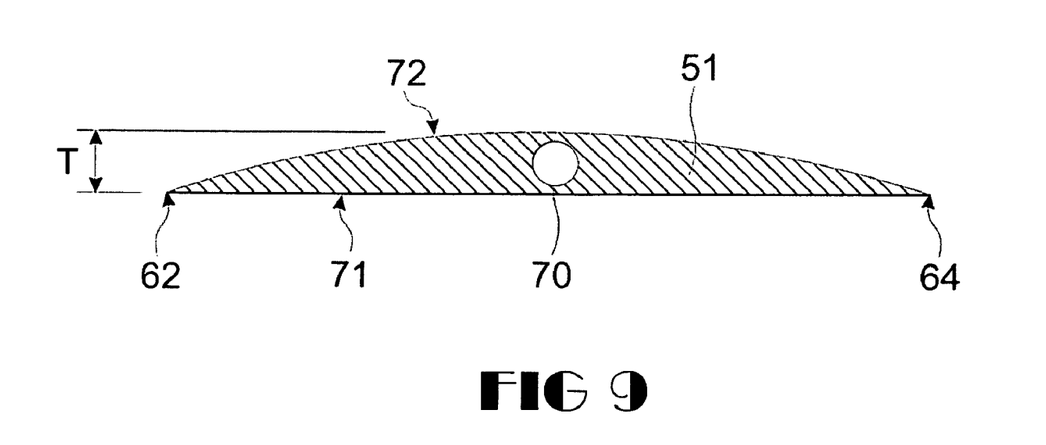
FIG. 9 is a cross-sectional end view of the improved rotor base.

Referring now to FIG. 9, there is shown a cross-sectional end view of the present rotor blade 51 having leading edge 62 and trailing edge 64. Side 71 is the high pressure side and side 72 is the low pressure side. In this embodiment, the high pressure side 71 is linear and the low pressure side 72 is curved. The curved low pressure side 72 is defined by the same radial curve as previously discussed for forming the elliptically-curved leading edge 62 and trailing edge 64, where the length of the radial lines Radius I and Radius II is eight times base Width W, respectfully. Low pressure side 72 would have the same degree of curvature formed by a radius of (8.0)W.

The cross-sectional view in FIG. 9 is taken near rotor base 65. In the lower portion of the rotor blade, from (1.0)BW extending upward for a distance, there is a channel 70 for receiving a perpendicular pivotal rotor blade support axial 75, discussed below. Thickness is designated T, where the rotor blade 51 is thickest in the center and progressively thinner toward the edges 62,64. The thicker center provides structural strength, and a center thick enough to receive the perpendicular rotor blade pivotal support axial 75. As previously discussed, prior art rotor blades tend to be thickest toward the leading edge, and thinner toward the trailing edge. The present rotor blade is symmetrical being thickest at its center and progressively thinner toward the edges.

Figure 10:
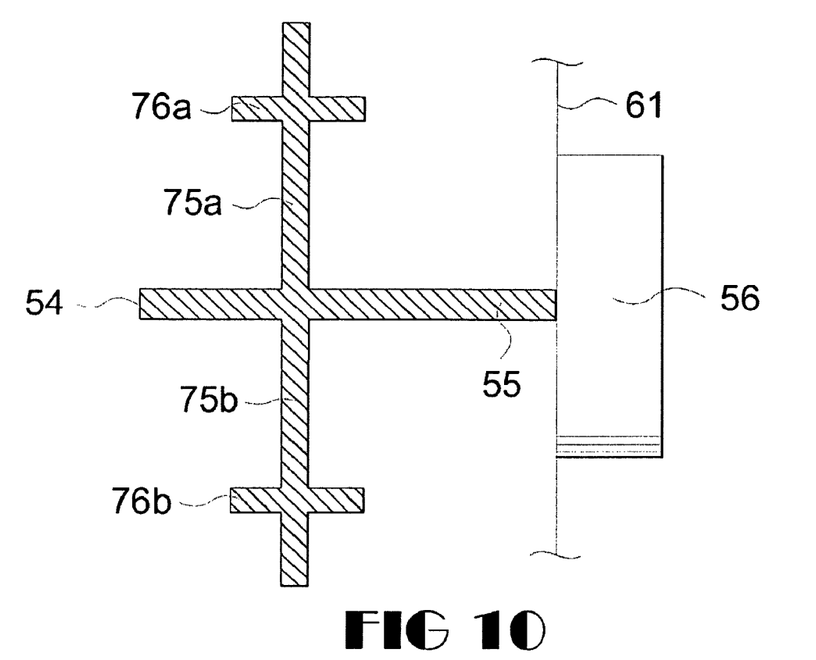
FIG. 10 is a schematic cross-sectional side view of the rotor shaft with perpendicular pivotal support axial.

Referring now to FIG. 10, there is shown a schematic cross-sectional side view of the rotor shaft 55 with attached perpendicular pivotal support axial 75a,75b. These extend through the hub 53 into channel 70 in the base of the rotor blade as shown in FIG. 9. The pivotal support axial 75a,75b functionally connects the base of the rotor blade to the rotor shaft 55 in a manner such that the blade can pivot around the shaft. The rotor shaft 55 is positioned at the axis of rotation 54, and extends into a step-up gear box 56 through a water tight seal in the housing 61 which forms a water tight nacelle around the step-up gears and generator, not shown. The other end of the rotor shaft 55 is external to the housing 61, and has attached the upper perpendicular pivotal axial 75a and a lower perpendicular pivotal axial 75b. The pivotal axial 75a,75b extend through the hub into channels in the lower portion of the rotor blade pivotally connecting rotor blades 62,63 to the rotor shaft 55.

There is further shown securing rings 76a and 76b perpendicularly attached to the pivotal support axial 75a,75b, respectfully. The securing rings 76a,76b secure the rotor blades to the rotor shaft 55 in a manner that the rotor blades can be pivoted around the pivotal support axial 75a,75b. The securing ring 76a is a circular ring fitting in channel 70. In the illustration, there is shown one securing ring per pivotal support axial, in practice, there could be a plurality of securing rings for additional support.

The rotor blades 62,63 could be permanently attached to the perpendicular pivotal axial 75a,75b, respectively, as may be desirable in deep steady currents, or there can be a pivotal connection as discussed above for the preferred embodiment. The rotor shaft 55 is positioned at the axis of rotation 54, and transfers the rotation mechanical energy to the step-up gears 56. In the example, there are two rotor blades functionally connected to the rotor shaft 55. If three or more rotor blades were used, there would be three or more perpendicular pivotal support axial equally spaced around the rotor shaft.

Figure 11:
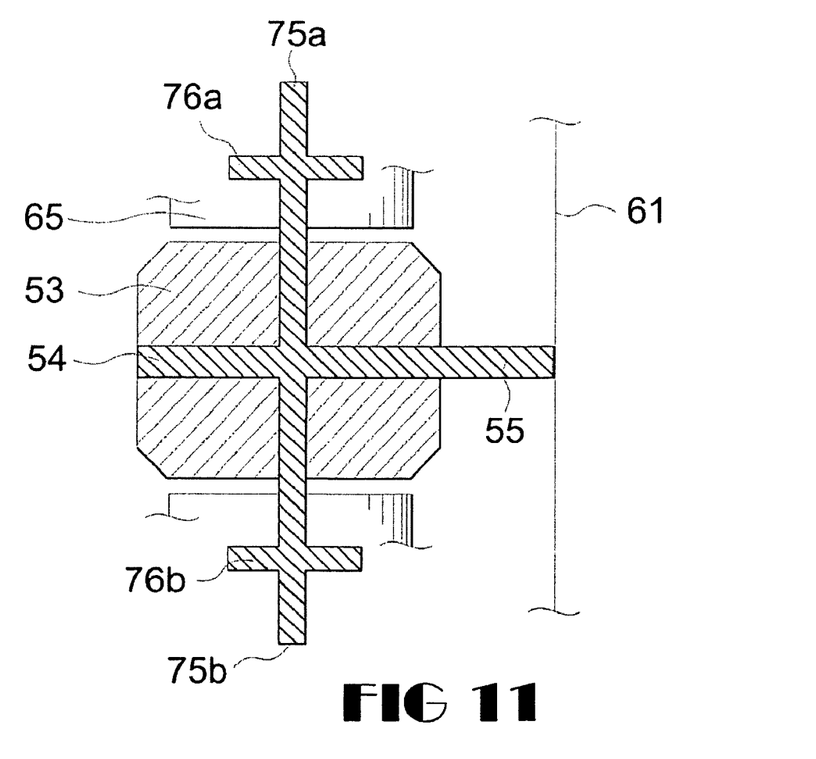
FIG. 11 is a cross-sectional side view of the rotor shaft with perpendicular pivotal support axial positioned in channels in the hub.

Referring now to FIG. 11, there is shown a cross-sectional side view of the rotor shaft 55 with pivotal support axial 75a extending through the hub 53 up to the base of rotor blades 65; pivotal support axial 75a,76b extends into a channel in the counter-balanced rotor blade. The rotor shaft 55 is centered around the axis of rotation 54, and one end extends thought housing 61. Securing rings 76a,76b extend perpendicularly from the pivotal support axial 75a,75b, respectfully, to secure the rotor blades to the rotor shaft 55 in a manner allowing the rotor blades to pivot around the axial.

Figure 12:
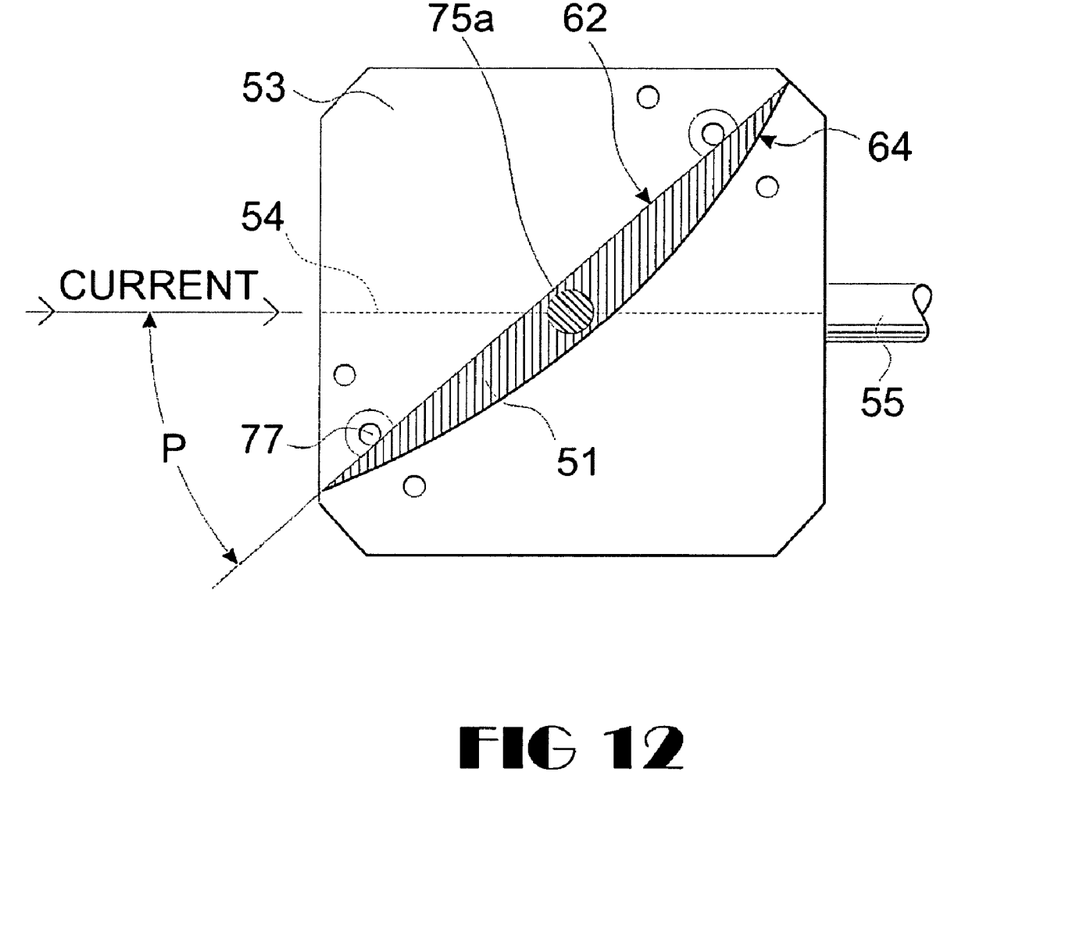
FIG. 12 is a top view of the rotor blade on the hub where the rotor blade and perpendicular pivotal support axial are shown as cross-sectional.

Referring now to FIG. 12, there is shown a top view of the rotor blade 51 functionally connected to rotor shaft 55, where the rotor blade 51 and the perpendicular pivotal support axial 75a are shown as cross-sectional, positioned on the top surface of hub 53. The pivotal support axial 75a is attached to the rotor shaft 55, which transfers the rotation mechanical energy to the gear box, not shown. The rotor shaft 55 is at the axis of rotation, represented by the broken line 54. The currents flow into the high pressure side 62 causing the rotor blade to turn, the curved side is the low pressure side 64.

Pitch, designated P, is used in this discussion to describe the angle between the axis of rotation 54 and the high pressure side 62 of the rotor blade 51. The Pitch P determines the angle at which the water current strikes the rotor blade. In an ideal situation, the axis of rotation would be parallel to the flow of water in a horizontal-axis turbine, however, in practice this is not always the case since the exact direction of tidal currents are influenced by several factors including wind.

The rotor blade 51 can be pivotally rotated around the pivotal support axial 75a in a manner to adjust the Pitch, P. Once the P has been adjusted to the desired setting, the rotor blade is held in position by locking pins 77. Locking pins 77 are in the example semi-circular fasteners attached to the high pressure side 62 of the rotor blade 51. The top of the hub 53 has a plurality of holes. Once the P has been set, pins are inserted through holes in the locking pin fastener into the corresponding hole in the top of the hub 53 thereby securing the angle of the blade relative to the hub, thus the P, where P is defined as the angle between the axis of rotation 54 and the high pressure side 62 of the rotor blade 51. The semi-circular fasteners, the pins, and the plurality of holes in the hub constitute a locking pin means.

In the illustrative example, P is set at about forty degrees. If P were set such that the high pressure side 62 were parallel to the current flow, it follows the rotor blade would not turn. This would be desirable during violent current conditions to protect the generator. (At this setting the P could have a slight negative value since the axis of rotation is at the center of the pivotal support axial.) If the P were set at ninety degrees, the high pressure side 62 would effectively block the current and the blade would not turn with a regular pattern. Therefore P is set somewhere between the two during operation, usually between thirty and sixty degrees.

The turning of the rotor blade extracts kinetic energy from the flowing water transforming the energy to rotational mechanical energy which is used to generate electricity. There has been some concern expressed that removing too much of the kinetic energy could have negative environmental effects locally. Adjusting the P in the present design would allow one to adjust the amount of kinetic energy removed; a lesser P would extract less energy and a greater P would extract more energy. The P is generally set somewhere between thirty and sixty degrees during operation.

Tidal currents flow inward during high tides and outward during low tides twice per day. To harvest the kinetic energy during the bi-directional flow cycles, the direction of the generator would either have to be reversed, or the angle of the rotor blades would have to be reversed for out-flow. The pivotal support axial design would allow for changing the direction of the rotor blade such as to be effective in bi-directional currents.

In summary, the improved rotor blade 51 of the present disclosure is defined as a blade having a rotor base 65 with Width W, a leading edge 62, a tip 68, and a trailing edge 64. The leading edge begins at the front of the base 66 and continues to the rotor tip 68, and the trailing edge 64 begins at the rear of base 67 and continues to the rotor tip 68. The leading edge 62 and the trailing edge 64 are further defined as elliptical curves which have a radius of eight times the base width, (8.0)W. A straight line drawn from the front of base 62 to the tip 68 has a linear distance of (4.0)W and forms a forty five degree angle with respect to the rotor base 65, which is parallel with the axis of rotation. The rotor blade is used to capture the kinetic energy of flowing water which is transferred to a generator 57 as rotational mechanical energy through a rotor shaft 55. The rotor blade 51 is functionally connected to the rotor shaft 55 through a perpendicular pivotal support axial 75 which allows the pitch of the rotor blade to be adjusted. Securing rings 76 secure the rotor blade 51 to the rotor shaft 55. The rotor shaft 55 transfers the rotational mechanical energy to a step-up gear box 56 which increases the rotational speed sufficient to generate electricity which is transferred to an electric grid.

The present invention may, of course, be carried out in ways other than those herein set forth without parting from the spirit and essential characteristics of the invention. The present embodiments are therefore to be considered in all respects as illustrative and not restrictive, and all changes coming within the meaning and equivalency range of the appended claims are intended to be embraced therein.

What is claimed is:

1. A submersible electrical power generating system including a generator means for generating electricity having a support means for positioning and maintaining said generator means in a water current, wherein the improvement comprises: a rotor blade, oriented about a horizontal axis of rotation parallel to said water current, having a base with Width W, a leading edge, a tip, and a trailing edge, where said leading edge begins at a front end of said base and continues to said tip and said trailing edge begins at said tip and continues to a back of said base, where said leading edge and said trailing edge are further defined as elliptical curves having a radius of eight times the Width W where a straight line from said front of base to said tip forms a forty five angle with respect to said base, where kinetic energy in said water current causes said rotor blade to turn converting said kinetic energy to rotational mechanical energy, where said rotor blade is functionally connected to a hub having at its center a rotor shaft forming the axis of rotation where one end of said rotor shaft functionally extends interior to said generator means for transferring said rotational mechanical energy, and said rotor shaft has at an other end a perpendicular pivotal support axial extending through a channel in said hub pivotally connecting said rotor blade such that pitch of said rotor blade can be adjusted by pivoting said rotor blade around said pivotal support axial, thereafter said rotor blade is secured to said hub with a locking pin means maintaining set pitch.

2. A power generating system as recited in claim 1, further comprising a securing ring perpendicularly attached to said pivotal support axial for securing said rotor blade to said rotor shaft.

3. The power generating system as recited in claim 1, wherein said locking pin means includes a semi-circular fastener attached to said rotor blade where said fastener is aligned with one of a plurality of holes in said hub for setting said pitch when after a pin is placed through said fastener into said hole for maintaining selected pitch.

4. The power generating system as recited in claim 1, wherein said pitch of said rotor blade is set between 30 to 60 degrees during operation and is secured at the position with said locking pin means.

5. The power generating system as recited in claim 1, wherein said pitch is set at zero degrees as may be desirable during violent currents.

6. A rotor blade system used in combination with a generator means for generating electricity having a support means for positioning and maintaining said generator means in a water current to form a submersible electrical power generating system, comprising: a rotor blade, oriented around a horizontal axis of rotation parallel to said water current, having a rotor base characterized by a Base Width BW, with a bottom of said base being equal to 1.0 BW, extending upward with a plurality of cross-sectional areas of variable width less than BW depending on the location up to a rotor tip where Width equals 0.0 BW with mid-point between said rotor base and said rotor top having the width equal to 0.5 BW, where the summation of forward edges of said cross-sectional areas form a leading edge extending from a front end of said rotor base to said rotor tip and a summation of back edges of cross-sectional areas form a trailing edge extending from said rotor tip to back of said base, where said leading edge and said trailing edge are defined by being elliptical curves having a radius of eight times said base Width, where a straight line extending from said front of said base to said tip forms a forty five degree angle with respect to said rotor base, where said rotor blade is functionally connected to a rotor shaft which includes a perpendicular pivotal support axial extending through a channel in a hub, where the pitch of said rotor blade relative to said hub is set to cause the kinetic energy in said water current to turn said rotor blade transforming said kinetic energy to rotational mechanical energy which is transferred to said generator means through said rotor shaft.

7. A rotor blade system as recited in claim 6, further comprising a pivotal support axial perpendicularly attached to said rotor shaft for allowing the pitch of said rotor blade relative to said rotor shaft to be adjusted by pivoting said rotor blade around said pivotal support axial.

8. A rotor blade system as recited in claim 7, further comprising a securing ring perpendicularly attached to said pivotal support axial for securing said rotor blade to said rotor shaft.

9. A rotor blade system as recited in claim 8, further comprising a securing lock means for maintaining a pre-set pitch.

10. A rotor blade system as recited in claim 9, wherein said pitch is set between thirty and sixty degrees.

11. A rotor blade system as recited in claim 9, wherein said pitch is set at zero degrees as may be desirable during violent currents.

12. An improved method for generating electricity with a submersible electrical power generating system which includes a generator means for generating electricity having a support means for positioning and maintaining said generator means in a water current, wherein the improvement in the method comprises the following steps:

a. harnessing the kinetic energy of flowing water by placing said generator means parallel to said water current, where said generator means is functionally connected to a rotor blade which has a base of Width W, a leading edge, a rotor tip, and a trailing edge, where said leading edge begins at a front end of said base and extends to said tip and said trailing edge begins at said tip and continues to a back end of said base, where said leading edge and trailing edge are defined by elliptical curves having a radius of eight times the Width of said base, thereby forming an elliptically curved blade with a common reference of a straight line from said front of base to said tip which forms a forty five degree angle with said base;

b. connecting said rotor blade to a rotor shaft through a perpendicular pivotal support axial such that said rotor blade can be pivoted around said pivotal support axial to adjust the pitch;

c. setting the pitch of said rotor blade relative to said rotor shaft at an angle sufficient to cause said rotor blade to turn when water strikes said leading edge flowing back to said trailing edge thereby converting the kinetic energy of the flowing water to rotational mechanical energy;

d. transferring said rotational mechanical energy to a step-up gear box functionally connected to said generator means through said rotor shaft which is positioned at the axis of rotation and has an internal end extending into said gear box and the external end having said perpendicular pivotal support axial which extends through a channel in a hub functionally connecting said rotor blade to said rotor shaft thereby providing a pivotal means for adjusting pitch of said rotor blade relative to said hub; and e. increasing the rotational speed with said gear box transferring the mechanical energy to said generator means for generating and delivering electricity to an electric grid.

13. The improved method as recited in claim 12, wherein step c is practiced by setting said pitch to between thirty and sixty degrees during operation and maintaining pitch with a locking pin means.

\* \* \* \* \*